United States Patent [19]

Carobbi et al.

[11] Patent Number: 4,937,295
[45] Date of Patent: Jun. 26, 1990

[54] BORON RESINS OF HIGH SELECTIVE ABSORBENT POWER

[75] Inventors: Renato Carobbi, Pistoia; Franco Innocenti, Bagno a Ripoli, both of Italy

[73] Assignee: Sirac Srl, Italy

[21] Appl. No.: 171,436

[22] Filed: Mar. 21, 1988

[30] Foreign Application Priority Data

Apr. 3, 1987 [IT] Italy .................. 19966 A/87

[51] Int. Cl.$^5$ .............................................. C08F 8/00
[52] U.S. Cl. ........................ 525/329.7; 525/330.3; 525/337; 526/239
[58] Field of Search .................... 525/329.7, 337; 526/239

[56] References Cited

U.S. PATENT DOCUMENTS

| | | | |
|---|---|---|---|
| 3,663,659 | 5/1972 | Kray et al. | 525/337 |
| 4,355,140 | 10/1982 | Manzick | 525/337 |
| 4,506,036 | 3/1985 | Filippini et al. | 521/149 |
| 4,542,161 | 9/1985 | Filippini et al. | 521/149 |

FOREIGN PATENT DOCUMENTS

| | | |
|---|---|---|
| 0085836 | 8/1983 | European Pat. Off. . |
| 0159521 | 10/1985 | European Pat. Off. . |

*Primary Examiner*—Bernard Lipman
*Attorney, Agent, or Firm*—Arnold, White & Durkee

[57] ABSTRACT

Stable boron resins of high selective absorbent power and their production process. Said boron resins consist of a polyacrylic matrix functionalized with quaternary groups, an epoxy group and phenylboric groups in accordance with general formula (I):

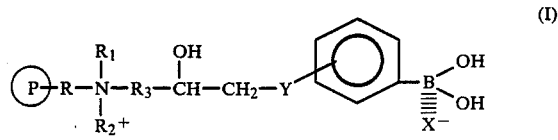

(I)

in which P, R, $R_1$, $R_2$, $R_3$, Y and $X^-$ are as defined in the text.

The resin is prepared by condensing an acrylic resin with an epihalohydrin and then with a halide or hydroxide of an oxiphenyl-aminophenyl- or thiophenyl-boroxin or their alkyl derivatives.

Compared with similar currently known resins, the resins of formula (I) have improved selectivity in sugar separation. They can be used for purifying lactulose.

1 Claim, No Drawings

BORON RESINS OF HIGH SELECTIVE ABSORBENT POWER

This invention relates to new boron resins possessing very high selective abaorbent power which are stable in organic solvents and in aqueous acid and alkaline solutions.

More particularly, the invention relates to boron resins consisting of an acrylic polymer matrix functionalised with quaternary ammonium groups, an epoxy group and phenylboric groups, of general formula (I):

$$P-R-\underset{R_2^+}{\overset{R_1}{\underset{|}{N}}}-R_3-\underset{|}{\overset{OH}{\underset{|}{CH}}}-CH_2-Y-\underset{X^-}{\overset{}{\bigcirc}}-B\underset{OH}{\overset{OH}{\diagdown}} \quad (I)$$

in which:
P is the polyaorylic matrix
R is $-(CH=_2)_n-$ where n lies between 0 and 5
$R_1$ and $R_2$, which can be the same or different, are $C_1-C_5$ alkyl
$R_3$ is $-(C_nH_{2n})$ where n varies from 1 to 5
Y is $-O-$, $-S-$, $$-\underset{R}{\overset{}{\underset{|}{N}}}-$$

where R is a $C_1-C_5$ alkyl
$X^-$ is an anion chosen from halogens and hydroxyl The invention also relates to a Prooess for producing the boron reains deiined by general formula (I).

In European Pat. No. 85102934.8 we have already described boron resins with a polyacrylic matrix bifunctionalised with quaternary ammonium groups and alkylphenylboric groups, which possess good chemical and mechanical stability characteristics and can be used in industrial processes, they having a marked selective absorbent action particularly in separating lactulose from its mixtures with other carbohydrates, generally lactose and galactose.

It has now been discovered that boron resins with further improved selectivity in separating sugars can be obtained by the process of the present invention, which is described in detail hereinafter.

The boron resins of ihe present invention are prepared from a polyacrylic resin obtained by cross-linking an acrylic ester with divinylbenzene and preferably having the following characteristics:

| Percentage of cross-linkage | 4% |
| --- | --- |
| Mean pore diameter | 1100 Å |
| Specific surface area | 10 m²/g |
| Particle size | 0.2-0.4 mm (90%) |

This resin is firstly subjected to a transamination reaction by reacting with disubstituted diamines.

The aminated acrylic resin is then reacted with an epihalohydrin in an inert solvent auch as tetrahydrofuran or dioxane, and the epoxy resin obtained in this manner is reacted at ambient temperature with a boroxin, to produce a resin represented by formula (I).

Alternatively, the chosen boroxin can firstly be reacted with an epihalohydrin to obtain an intermediate of general formula (II):

$$Hal-R_3-\underset{|}{\overset{OH}{\underset{|}{CH}}}-CH_2-Y-\underset{X^-}{\overset{}{\bigcirc}}-B(OH)_2 \quad (II)$$

and this be reacted with the aminated polyacrylic resin, to obtain a boron resin corresponding to general formula (I).

The preferred conditiona for implementing the individual process steps of the two alternatIves indicated schematically heretofore are as follows:

(a) Transamination reaction: this is conduced by known methods. by reacting the polyacrylic matrix with a disubstituted diamine, to obtain an aminated acrylic resin of general formula:

$$P-R-N\underset{R_2}{\overset{R_1}{\diagdown}}$$

where P, R, $R_1$ and $R_2$ have ihe aforesaid meanings.

(b) Reaction of the aminated acrylic resin with an epihalohydrin: the aminated acrylic reain is remain by a process comprising regenerating in $Cl^-$ form by reaction with a dilute NaCl and NHCl solution at about ambient temperature washing with demineralised water until neutral, regenerating in $OH^-$ form by treatment in aqueous ammonia at about ambient temperature washing with demineralised water until neutral, washing with acetone and drying under vacuum.

At this point the resin is placed in a polar aprotic solvent, such as dioxane, and heated under reflux with epichlorohydrin dissolved in the same solvent and a catalytic quantity of potassium iodide, heating under reflux to between 40° and 100° C. for 15-25 hours. After filtration and washing repeatedly with the same aolvent, the crude product is ready ior ihe subsequent reactions.

(c) Reaction with the boroxin: the resin obtained in (b) is treated, in suspension in an organic solvent of the type used in (b), with the chosen boroxin at a temperature of between 50° and 100° C. for 36-48 hours.

After cold filtration the product is washed repeatedly with the same solvent and then with a dilute sodium hydroxide solution It is finally washed with water until alkaline reactions disappear.

Aiternatively:

(a') Transamination reaction as in (a)

(b') Reacting the chosen boroxin with an epihalohydrin.

This reaction takes place in an aliphaiic hydrocarbon or chlorinated solvent at a temperature of between 0° and 10° C. for 10-15 hours.

After distilling off the solvent under reduced pressure, the product is taken up in a chlorinated aliphatic solvent. then again distilling to eliminate the excess epichlorohydrin.

A dense oil is obtained from which the required product is crystallised using a chlorinated aliphatic solvent.

(c') Reacting the product obtained in (b') with the aminated acrylic resin.

The aminated acrylic resin, remain as described in (b), is placed in a solvent of the type used in (b), for example dioxane, a product such as that obtained in (b') is added, together with a catalytic quantity of potassium iodide, and the mixture heated under reflux to a temperature of between 40° and 8° C. for 15-25 hours.

After cold filtration, the product is washed repeatedly with the same solvent and finally with solvent to which hydrochloric acid has been added, to obtain the required product.

The reaction sequence involved in the first alternative is for example the following:

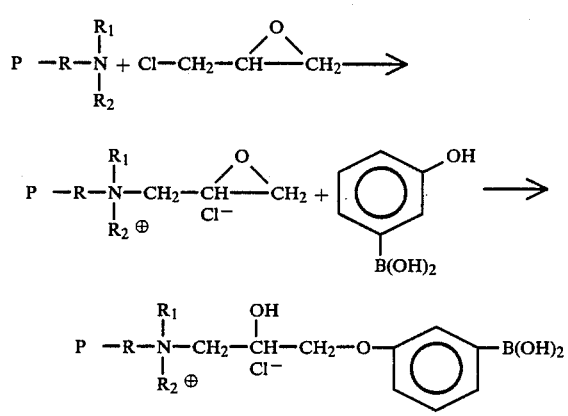

The reaction sequence involved in the second alternative is for the example the follwoing:

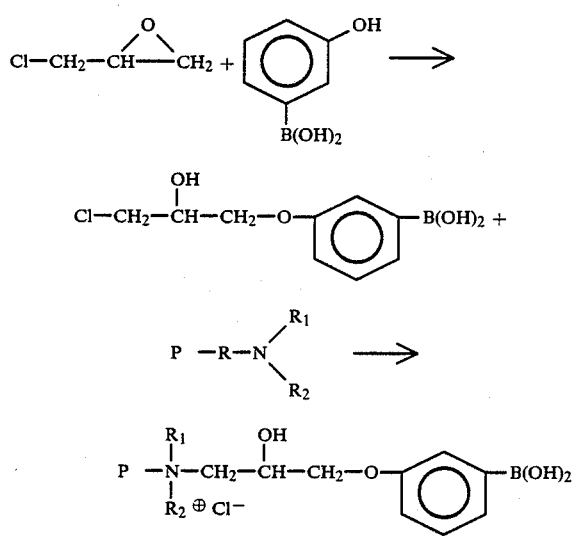

Some practical embodiments of the processes and resin of the present invention are given hereinafter in order to make the processes and resin more easily reproducible.

EXAMPLE 1

(a) Preparation of the polyacrylic matrix

A mixture consisting of 50 g of methylacrylate, 2 g of 1,4-divinylbenzene 1 g of 1,4-ethylvinylbenzene and 1 g of benzoyl peroxide in 250 ml of a 0.2% aqueous solution of polyvinyl alcohol is fed into a 500 ml flask fitted with an agitator, thermometer and condenser.

It is heated for 20 minutes to 50° C. and then overnight to 80° C. under suitable agitation. The product formed is filtered off, washed with deionised water, alcohol and ethyl ether. and dried at 50° C. in an oven under vacuum for 5 hours 47 g of copolymer are obtained, having the following characteristics:

| | |
|---|---|
| percentage of cross-linkage | 4% |
| mean pore diameter | 1100 Å |
| specific surface area | 10 m$^2$/g |
| particle size | 0.2-0.4 mm (90%) |

(b) Preparation of the aminated resin

The copolyser of step (a) is swollen for 4 hours in 400 ml of dimethylformamide and is then fed into a 50 ml flask fitted with a mechanical stirrer, thermometer and condenser with a calcium chloride tube 45 g of dimethyleihyldiamine and 0.5 g of K$_2$CO$_3$ as catalyat are added.

It is kept overnight at 15° C. under agitation, after which it is allowed to cool, the product filtered oii and washed with dimethylformamide. water, 4% NaOH and then again with water until neutral, then with alcohol, and is dried in an oven under vacuum at 60° C. for 4 hours. 45 g of amine resin are obtained having the following characteristics:

| | |
|---|---|
| N(CH$_3$)$_2$ | 6 meq/g of dry resin |
| mean pore diameter | 1000 Å |
| specific surface area | 12 m$^2$/g |
| particle size | 0.2-0.4 mm (80%) |

(c) Preparation of the epoxy resin 45 g of acrylo-amine resin irom step (b) are subjected to the following sequence oi operations:

the resin is regenerated in Cl$^-$ form by treatment with 130 ml of a NaCl solution of 100 g/l concentration at a temperature of 20° C. for 60 minutes; the regeneration is completed by treatmert with 150 ml of a 10% HCl solution at a temperature of 20° C. for 40 minutes;

the resin is washed with demineralised water until neutral;

the resin is regenerated in OH$^-$ form by treatment with 200 ml of an NH$_3$ solution of 40 g/l concentration at a temperature of 20° C. for 90 minutes;

the resin is washed with demineralised water until neutral;

it is washed with acetone and dried by heating under vacuum at 55° C. for 8 hours;

200 ml of dioxane are added to the resin and the resin left in the dioxane at ambient temperature for 24 hours. 40 grams of resin pretreated in this manner, corresponding to 160 ml. are fed into a glass flask fitted with a reflux condenser, a CaCl$_2$ tube, thermometer and mechanical agitator.

120 ml of epichlorohydrin dissolved in 500 ml of dioxane and 20 g of potassium iodide are added, the mixture suitably agitated and kept at 50° C. for 24 hours.

On termination of the reaction, the mixture is filtered through a Buchner iunnel and washed by mashing three times successively with 500 ml of dioxane each time, followed by filtration The product is used crude in ihe next reaction.

(d) Preparation of epoxyaminoboron resin

The crude epoxy resin from the preceding reaction is placed in 1000 ml of dioxane 120 g of m-aminobenzeneboronic acid are then added.

The suspension is heated to 80° C. and kept under agitation for 42 hours.

On termination of the reaction the mixture is filtered cold through a Buchner funnel, the residue obtained is taken up in 1000 ml of a dioxane/0.2 N NaOH mixture and again filtered.

The product is then mashed with 1000 ml of a 0.2 N NaOH solution, the resin filtered through a Buchner funnel and washed abundantly with water until alkaline reaction in the filtrate disappears.

In this manner 55 g of reain are obtained with a volume of about 210 ml.

The resin has the following characteristics:

| | |
|---|---|
| degree of functionalisation | 4.1 meq of boron per gram of dry resin |
| percentage of cross-linkage | 4% |
| pore diameter | 1000 Å |
| specific surface area | 20 m$^2$/g |
| apparent density | 0.75 g/ml |
| real density | 1.4 g/ml |
| particle size | 0.2–0.4 mm (80%) |

(e) Preparation of epoxy oxy-boron resin

The crude resin from the preceding reaction is placed in 1000 ml of dioxane 120 g of m-hydroxyboronic acid are then added.

The suspension is heated to 80° C. and kept under agitation for 42 hours.

On termination of the reaction the mixture is filtered cold through a Buchner funnel, the residue obtained is taken up in 1000 ml of a dioxane:/0.2 N NaOH mixture and again filtered.

The product is then mashed with 1000 ml of a 0.2 NaOH solution, the resin filtered through a Buchner funnel and washed abundantly with water until alkaline reaction of the filtrate disappears.

55 g of resin are thus obtained with a volume of about 210 ml

The resin has the following characteristics:

| | |
|---|---|
| degree of functionalisation | 4.4 meq of boron per gram of dry resin |
| percentage of cross-linkage | 4% |
| pore diameter | 1000 Å |
| specific surface area | 20 m$^2$/g |
| apparent density | 0.81 g/ml |
| real density | 1.35 g/ml |
| particle size | 0.2–0.4 mm (80%) |

EXAMPLE 2

(a) Preparation of the intermediate:

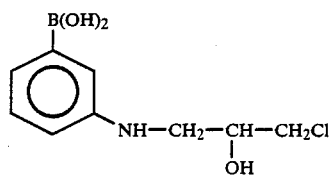

50 g of m-aminobenzeneboronic acid are placed in a 250 ml flask and 150 ml of epichlorohydrin are added.

The mixture is cooled to 0°–10° C. and kept at this temperature for 12 hours.

On termination, the solvent is distilled off under vacuum and the residue taken up in dichloropropane, again distilling to remove excess epichlorohydrin.

The dense oil obtained is crystallised from methylene chloride, 32 g of the product concerned are obtained, with an M.P. of 78°–80° C.

| Elementary analysis for C$_9$H$_{13}$ClBNO$_3$ | | | M.W. 229.26: |
|---|---|---|---|
| Calculated: | C 47.1 | N 6.1 | H 5.67 |
| Found: | C 47.6 | N 5.7 | H 5.6 |

(b) Preparation of the intermediate:

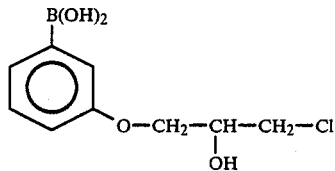

50 g of m-hydroxybenzeneboronic acid are placed in a flask and 150 ml of epichlorohydrin are added.

The mixture is heated to 30°–40° C. and kept at this temperature for 8 hours.

On termination. the solvent is distilled off under vacuum. The oily residue is taken up in 300 ml of ethanol at 50°–60° C. treated with active carbon and filtered.

The clear solution obtained is concentrated to one half its volume, and left standing at 2°–3° C. overnight.

In this manner 42 g of product precipitate and are crystallised from methylene chloride (180 ml) to obtain 38 g of the required product. M.P. 102°–105° C.

| Elementary analysis for C$_9$H$_{12}$ClBO$_4$ | | | M.W. 230.26 |
|---|---|---|---|
| Calculated: | C 46.4 | N 5.2 | Cl 15.39 |
| Found: | C 46.7 | N 5.1 | Cl 15.6 |

(c) Preparation of opoxy-oxy-boron resin

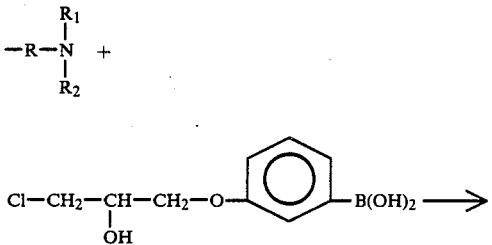

45 g of acrylo-amine resin are subjected to the following sequenoe of operations:

the resin is regenerated in Cl$^-$ form by treatment with 130 ml of an KaCl solution of 100 g/l concentration at a temperature of 20° C. for 60 minutes; the regeneration is completed by treatment with 150 ml of a 10% HCl solution at a temperature of 20° C. for 40 minutes;

the resin is washed with demineralised water until neutral;

the resin is regenerated in OH⁻ form by treatment with 200 ml of an $NH_3$ solution of 40 g/l concentration at a temperature of 20° C. for 90 minutes;

the resin is washed with demineralised water until neutral;

it is washed with acetone and dried by heating under vacuum to 55° C. for 8 hours;

200 ml of dioxane are added to the resin and the resin left in dioxane at ambient temperature for 24 hours.

40 grams of resin pretreated in this manner, corresponding to 100 ml. are fed into a glass flask fittied with a reflux condenser, a $CaCl_2$ tube, thermometer and mechanical agitator.

1200 ml of dioxane, 65 g of the product of point (b) and 21.8 g of KI are then added. The mixture is suitably agitated, heated to 50° C. and kept under these conditions for 24 hours On termination of the reaction, the mixture is filtered through a Buchner funnel and washed by three successive mashing and refiltering operations, the first mashing being on 500 ml of dioxane, the second in 400 ml of a dioxane/0.1 N HCl mixture in a 2/1 volume ratio, and the third in 300 ml of 0.1 N HCl 53 g of resin are obtained with a volume of 200 ml; the resin is of cream colour with a certain quantity of light brown beads, and has the following characteristics:

| degree of functionalisation | 4.8 meq of B per gram of dry resin |
|---|---|
| percentage of cross-linkage | 4% |
| pore diameter | 1000 Å |
| specific surface area | 20 m²/g |
| apparent density | 0.81 g/ml |
| real density | 1.35 g/ml |
| particle size | 0.2-0.4 mm (80%) |

EXAMPLE 3

A boron resin of the characteristics of example 1d is rehydrated in deionised water for 8 hours.

100 cc of this resin are placed in a 26 mm diameter column and fed for 60 minutes with 45 cc of a lactulose syrup solution (lactulose 50% by weight. lactose 4% by weight, galactose 4.5% by weight, other sugars 7% by weight) diluted 1 to 2 with deionised water and alkalinised to give a final solution of pH 8. By elution with a mobile phase of the same pH. 180 cc of a solution are obtained containing 21.6 g of unretained sugars, comprising:

| lactulose | 17.8 g |
|---|---|
| lactose | 2.1 g |
| galactose | 1.7 g |

The column is then eluted with a 1 N HCl solution to obtain 150 cc of lactose-free solution containing:

| lactulose | 11.7 g |
|---|---|
| galactose | 0.25 g |

EXAMPLE 4

A boron resin of the characteristics of example 1e is rehydrated in deionised water for 8 hours.

100 cc of this resin are placed in a 26 mm diameter column and fed for 60 minutes with 45 cc of a lactulose syrup solution (lactulose 50%, lactose 1% by weight. galactose 5.5% by weight. other sugars 7% by weight) diluted 1 to 2 with deionised water and alkalinised to give a final solution of pH 8. By elution with a mobile phase of the same pH, 180 cc of a solution are obtained containing 20 8 g of unretained sugars, comprising:

| lactulose | 16.8 g |
|---|---|
| lactose | 2.1 g |
| galactose | 1.9 g |

The column is then eluted with a 1 N HCl solution to obtain 150 cc of a lactose-free solution containing:

| lactulose | 12.5 g |
|---|---|
| galactose | 0.3 g |

We claim:

1. Boron resins of general formula (I):

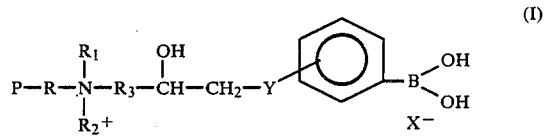

in which:
P is a polyacrylic matrix
R is —$(CH_2)_n$— where n lies between 0 and 5
$R_1$ and $R_2$, which can be the same or different, are $C_1$-$C_5$ alkyl
$R_3$ is —$(CH_2)_n$ where p varies from 1 to 5
Y is —O—, —S—,

where R is a $C_1$-$C_5$ alkyl
X⁻ is an anion chosen from halogens and hydroxyl.

* * * * *

UNITED STATES PATENT AND TRADEMARK OFFICE
CERTIFICATE OF CORRECTION

PATENT NO. : 4,937,295
DATED : June 26, 1990
INVENTOR(S) : Renato CAROBBI et al.

It is certified that error appears in the above-identified patent and that said Letters Patent is hereby corrected as shown below:

On the title page, [73] Assignee:, change "SIRAC Srl, Italy" to -- INALCO Spa, Italy--.

Signed and Sealed this

Thirty-first Day of December, 1991

Attest:

HARRY F. MANBECK, JR.

*Attesting Officer*     *Commissioner of Patents and Trademarks*